(12) United States Patent
Aisa

(10) Patent No.: US 6,487,509 B1
(45) Date of Patent: Nov. 26, 2002

(54) METHOD FOR THE ENERGY MANAGEMENT IN A DOMESTIC ENVIRONMENT

(75) Inventor: Valerio Aisa, Fabriano (IT)

(73) Assignee: Wrap SpA, Fabriano (IT)

(*) Notice: Subject to any disclaimer, the term of this patent is extended or adjusted under 35 U.S.C. 154(b) by 1218 days.

(21) Appl. No.: 08/603,750

(22) Filed: Feb. 20, 1996

(51) Int. Cl.[7] .............................................. G01R 21/00
(52) U.S. Cl. .......................... 702/62; 702/60; 702/61
(58) Field of Search ................................ 364/492, 132, 364/138, 139, 480, 481, 483, 493, 550, 551.01; 340/310.01, 310.02, 310.06, 310.08; 307/35, 38, 39; 700/291, 295, 296; 702/60–62

(56) References Cited

U.S. PATENT DOCUMENTS

| | | | | |
|---|---|---|---|---|
| 4,324,987 A | * | 4/1982 | Sullivan, II et al. | 307/35 |
| 4,418,333 A | * | 11/1983 | Schwarzbach et al. | 340/310.01 |
| 5,268,666 A | * | 12/1993 | Michel et al. | 340/310.02 |
| 5,352,957 A | * | 10/1994 | Werner | 340/310.06 |
| 5,436,510 A | * | 7/1995 | Gilbert | 364/492 |
| 5,495,406 A | * | 2/1996 | Kushiro et al. | 340/310.01 |
| 5,543,667 A | * | 8/1996 | Shavit et al. | 307/39 |
| 5,544,036 A | * | 8/1996 | Brown, Jr. et al. | 364/492 |
| 5,589,764 A | * | 12/1996 | Lee | 364/483 |
| 5,598,349 A | * | 1/1997 | Elliason et al. | 364/492 |
| 5,625,236 A | * | 4/1997 | Lefebvre et al. | 364/492 |

FOREIGN PATENT DOCUMENTS

| | | |
|---|---|---|
| EP | 0250320 | 12/1987 |
| EP | 0319235 | 6/1989 |
| EP | 0433965 | 6/1991 |
| FR | 2404326 | 9/1978 |
| FR | 2672400 | 8/1992 |

OTHER PUBLICATIONS

IEEE Trans. on Consumer Electronics May 1991. vol. 37. No. 2.
FR 2 404 326 by Siemens.

* cited by examiner

Primary Examiner—Hal Wachsman
(74) Attorney, Agent, or Firm—Cesari and McKenna, LLP

(57) ABSTRACT

Apparatus and a method for management of energy consumption by appliances connected to a powered network wherein a plurality of the appliances are each provided with a programmed electronic control system adapted to transmit and receive to and from other electronic control systems and a device for measuring total network power consumption, information from which the power consumption of the appliances on the network and the maximum power available from the network can be determined. Each control system adjusts the power consumption of its corresponding appliance in accordance with the information that it receives and the instructions with which it is programmed without need for a central control unit or user intervention.

29 Claims, 5 Drawing Sheets

METHOD FOR THE ENERGY MANAGEMENT IN A DOMESTIC ENVIRONMENT

FIELD OF THE INVENTION

The present invention refers to a method for the management of the electric energy consumption in a domestic environment.

It is known that the theme of the home automation, i.e. of the integrated management of different electric devices being present in a home, is always increasing in interest.

DESCRIPTION OF THE BACKGROUND ART

The known home automation systems involve the presence of a central supervisor unit that usually provides to manage the different household appliances. By controlling some "intelligent" sockets, that therefore control the supply of the energy to the different household appliances by means of ON/OFF type operations.

These known centralized supervision systems present some drawbacks.

A first type of drawback is due to the complexity of the control units, which, having to manage a plurality of different domestic apparatuses in different times and ways, must be of the programmable type; this necessarily implies that the user is forced to a complicated programming activity.

A second type of drawback is due to the poor efficiency of the control and supervision system, which, as said before, manages the electric supply of different domestic apparatuses solely with ON/OFF type operations driven through the so called "intelligent" supply sockets; such control mode is clearly very elementary and approximate.

A third type of drawback is caused by the cost of the central supervision units which, because of its programmability, needs of a suitable user interface, composed typically by a keyboard and a display, and of an electronic control system with suitable elaboration and memory capability (for example a personal computer).

OBJECTS OF THE INVENTION

The main aim of the present invention is that of resolving the cited drawbacks of the known systems for managing the house electric appliances (represented, i.e., by household appliances such as washing or cooking machines), based on the use of supervision and control units of the centralized type.

Within such aim, the present invention strives to provide for an optimized management method, that avoids to overcome the limits of the installed maximum power being established by the contract with the electric energy supplier, and also allows to favour the use of different household appliances during time periods of reduced energy cost; this invention seeks similarly to show a method in which the optimized management of the energy can be obtained in a fully automatic way, without any action by the user.

These and other aims, that will appear clearer in the following, are reached according to the invention, by a method for the management of the electric energy consumption in a domestic environment incorporating the characteristics of the annexed claims.

BRIEF DESCRIPTION OF THE DRAWINGS

The characteristics and advantages of the present invention will become clear from the following description and the accompanying drawings, which are supplied as a pure elucidatory and non limiting example, wherein.

DETAILED DESCRIPTION OF THE INVENTION

Figure 1:
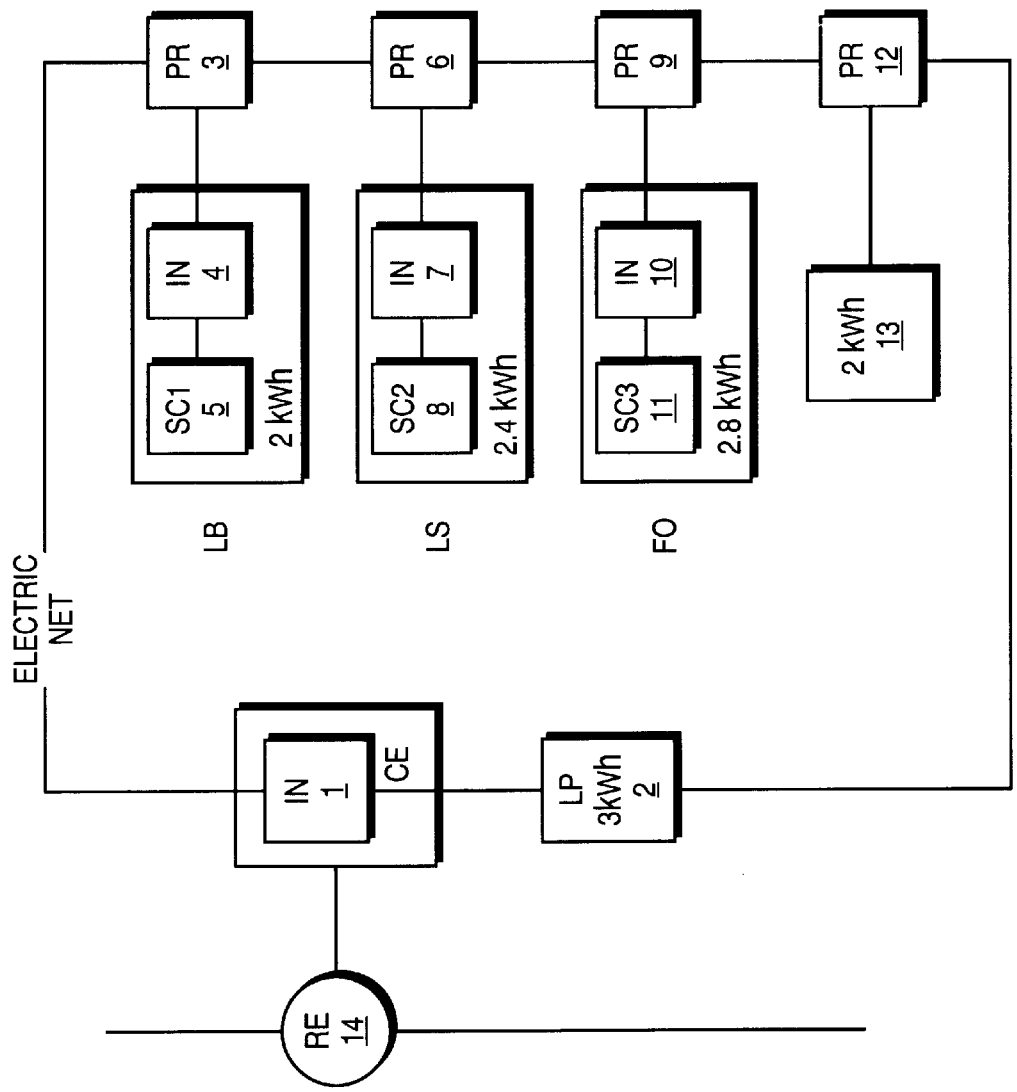
FIG. 1 schematically represents a domestic electric plant, equipped with some household appliances realized according to the present invention.

According to the present invention, the overcoming of limitations of the known management systems is obtained through the use of electric appliances able to dynamically self-adjust their own energy consumption, changing it continually with respect to the global energetic exigencies (variable during the day) of the domestic environment wherein they are to operate. In other words, according to the invention, these household appliances are quipped with control systems presenting the following main features:

1. ability to receive through a suitable transmitting medium and a suitable electronic interface, within regular intervals, information about the instantaneous electrical energy consumption of the domestic environment into which the appliances themselves operate. These information are supplied by a suitable, external measuring apparatus;
2. ability to evaluate the electrical energy consumption information with respect to the available maximum power limits established by the contract with the energy supplier;
3. ability to manage the electrical energy consumption with respect to the peculiar functions of the electrical appliance and, where possible, to the functions of the other electrical apparatuses in the home environment.

From the first cited feature, the need is evidenced of having a suitable instrument for the measure of the electric power being absorbed by the domestic environment. It is also evidenced the need of having an adequate communication system between the aforementioned measuring apparatus and the electric appliances, that are, according to the invention, equipped with a dynamic self adjustment system of the energy consumption.

From the second cited features the need is evidenced of equipping the appliance with a control system, being easily programmable with respect to the maximum power limits established by the contract between the user and the supplier of the electric energy.

From the third feature, finally, the necessity emerges of defining priority rules among the different domestic appliances, in order to ensure a dynamic distribution of the energy, being optimized in function of the type of the household appliances that are active time after time, and in function of the importance of their role for the user's need.

In the following of the present description there will be shown firstly the general method for optimizing and rationalizing the consumption of the electric energy in a domestic environment and, secondly, the possible embodiments for satisfying the needs evidenced by the above mentioned three features.

In particular, the optimized management of the electric energy of the domestic environment is obtained, according to the invention, by means of the following two actions:

- avoiding the overcoming of the fixed current absorption limits, i.e. to avoid the black-out due to the action of a power limiter;
- promoting in a simple way the use of different household electric appliances during time periods in which the electric energy has a reduced cost.

In the FIG. 1 a domestic electric plant is represented in a schematic way, wherein part of the loads (electric appliances LB, LS and FO), according to the present invention, are able to self-adjust their own energy consumption.

The electric energy is taken from an external distribution net RE (block 14), through an energy meter CE.

The power supplied through the meter CE is, as it normally happens, limited by means of a power limiter LP (block 2) that limits the installed power, in agreement with the supply contract that, in the case of the represented example, establishes a maximum power limit of 3 kWh.

Four electric appliances, being typically present in a domestic environment, are supplied through four sockets indicated with PR (blocks 3, 6, 9 and 12):

- a laundry washing machine LB with power absorption of 2 kWh, a dishwashing machine LS with power absorption of 2.4 kWh, an oven FO with power absorption of 2.8 kWh and an electric iron (block 13) with power absorption of 2 kwh.

The energy meter CE, the laundry washing machine LB, the dishwashing machine LS and the oven FO are connected to the electric net by means of a suitable electronic interface (blocks 1, 4, 7 and 10), with the aim of allowing a reciprocal exchange of information, according to the present invention; in the case herein described as an example, this is obtained through a known system of the carrier data transmission type, according to which said exchange of information is carried out through the same electric net, using a suitable bi-directional modem of the half-duplex type, that is a device able to exchange the information in the two directions, but in different times.

The three household appliances LB, LS and FO, being represented in FIG. 1, are furthermore equipped with a suitable control system, indicated respectively with SC1 (block 5), SC2 (block 8) and SC3 (block 11). Such control system, that in the following will be generically indicated with SC, is of fundamental importance for the aims of the present invention, because it allows the rationalization the electric energy consumption according to the mode shown in the flow chart shown in FIG. 2, that describes the general method through which, according to the invention, the energy consumption of an electric appliance is self-adjusted.

It has to be specified that the way of exchanging the information among the electric household appliances LB, LS and FO (the so-called communication protocols), does not represent the finality of the present invention, which only supposes the existence, in the domestic environment, of a suitable communication means or "bus", a suitable transmission line (in the case described herein, the carrier data transmission system) onto which the flow of information is managed by means of suitable rules (protocols). being in conformity with the specific international standards in the matter of safety, electromagnetic compatibility and information exchange.

For example, a "domestic bus" that satisfies all the requirements of the aforementioned international standard is that known as EHS (European Home System), recently developed in the purview of the program Esprit of the European Community. Another "bus" that satisfies the aforementioned international standard and which can be conveniently utilized in the present invention, is that proposed by the US Company Echelon, known with the name of LON (Local Operating Network).

Figure 2:
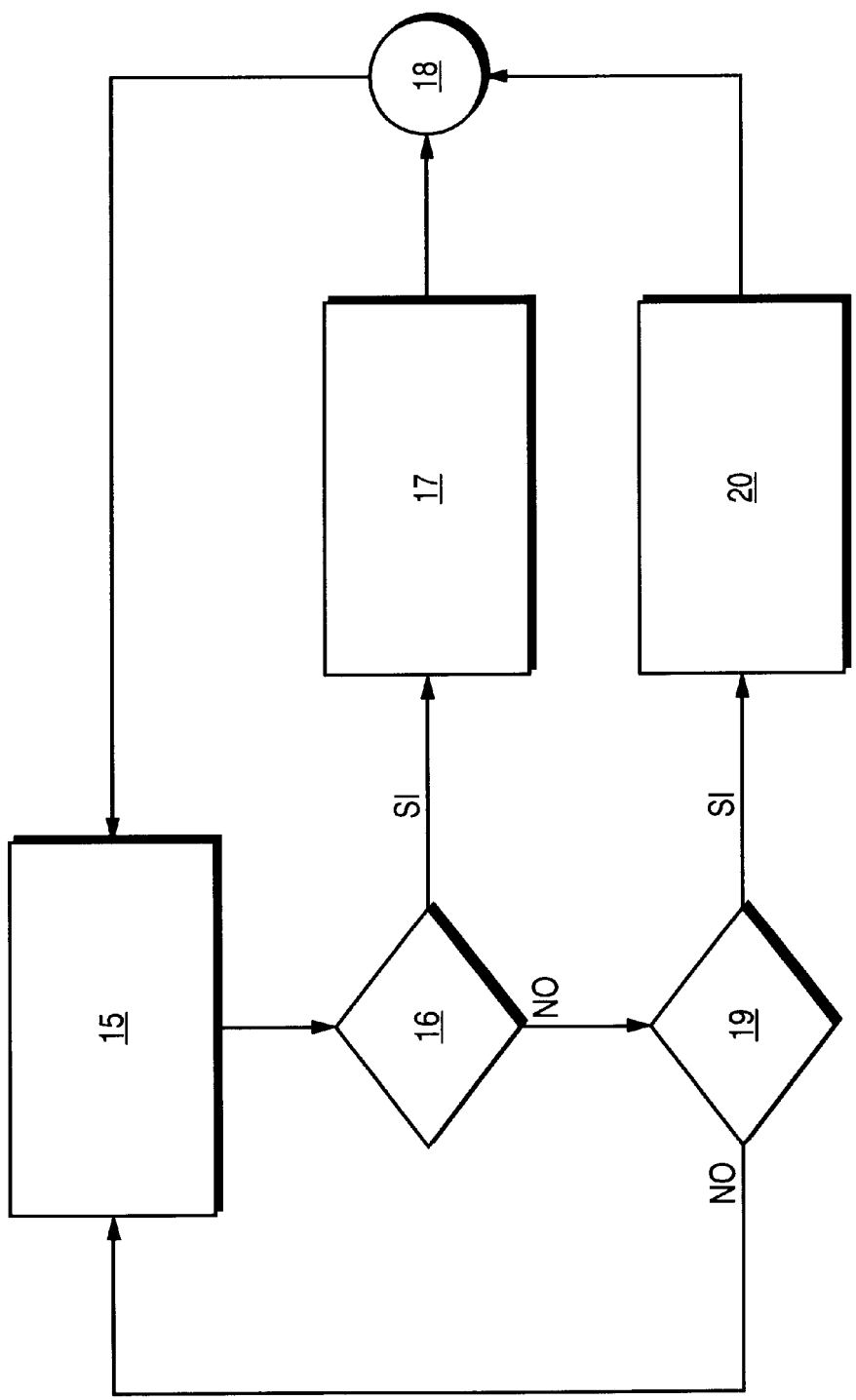
FIG. 2 represents, through a flow chart, the control system's general mode for managing the electrical energy consumption according to the invention.

In FIG. 2 a flow chart is represented, that describes the way in which the control system SC of any single electric appliance, being realized according to the present invention, is able to self-adjust its own electric energy consumption, in the respect of limits of the available power established by the supply contract.

In such FIG. 2, block 15 represents the communication element, according to invention, between the control system SC of any of the three electric appliances LB, LS and FO of FIG. 1 and a device that measures constantly the total electric power being absorbed (for explicative and non limiting purposes, in FIG. 1 such a device coincides with the energy meter CE of the domestic environment, having suitable characteristics that will be described in the following).

As already said, block 15 implies the existence of a communication "bus", that allows for the dialogue among the energy meter CE and the single electric appliances LB, LS and FO, in accordance with the international standards in the matter of safety, electromagnetic compatibility and information exchange.

Through block 15, the control system SC of each of the three household appliances (LB, LS and FO) receives from the energy meter CE, within regular time intervals (for example once any minute), the current value of the total power PT being absorbed at that instant by different active electric appliances of the domestic environment.

Block 16 is a test block, through which the control system SC of each of the three electric appliances verify if the current value of the total power being absorbed by different household appliances is greater than the maximum one (Pmax), which is established by the supply contract (contractual power) and adjusted by means of the power limiter LP (block 2 of FIG. 1).

If PT is greater than Pmax, then the control passes to block 17, and the control system SC provides FOR reducing the energy consumption of the relevant electric appliance of a quantity being greater or equal to the difference PT-Pmax; successively, through block 18, the control returns to block 15, so that the control system SC can update the value of the total power absorbed by different active electric appliances of the domestic environment.

If, coming back to block 16, PT it is minor or equal to Pmax, then the control passes to block 19, that it is a test block through which the control system SC verifies the power absorption state of the relevant electric appliance.

If the appliance is in a normal operating conditions, i.e. if there has not been any previous reduction of the power necessary at that moment for its normal operation, the control will pass again to block 15, for an updating of the total absorbed power.

On the contrary, if the control system SC has been previously obliged to reduce the energy consumption of the relevant electric appliance (block 17), the control will pass to block 20, that will operate again an increase of the energy consumption, but having care that the maximum power quantity being added cannot exceed the difference Pmax-PT.

Successively, the control will return again to block 15, through block 18.

Blocks 17 and 20 therefore represent respectively the ability of the control system SC of each electric appliance, to reduce or to lead to the normality status the energy consumption required by some particular phase of the operating cycle, during which the electric appliance is found to operate. Such ability depends, obviously, upon the degrees of freedom of the control system SC.

In the specific case of the household appliances LB, LS and FO represented in FIG. 1, where the greater part of the absorbed power relates to heating elements, we can think, for example, of fractionating said power between more elements (i.e. at least two resistances), in order to have the maximum energy absorption when all the heating elements are supplied. In that case, for reducing or increasing the absorbed power, it will be sufficient to deactivate or activate the single heating elements, according to the needs.

Thus, greater is the number of the heating elements, higher will be the number of possible regulations available for the control system SC and more rigorous will be, as a result, the management of the energy.

Block 15 of FIG. 2 expresses, as said before, the interaction between the energy meter CE and the household appliances (LB, LS and FO) equipped with a suitable control system SC, according to invention, being able to manage such interaction.

Such a block 15 supposes thus that the energy meter CE is able to send, within regular time intervals, through suitable transmission means (that, as said before, in the specific case of FIG. 1 are constituted by a carrier data transmission system) and with a standard exchange mode (e.g. protocol EHS or LON), the information relating to the total power absorbed by different active household appliances in the domestic environment.

The condition that the meter CE is able to talk directly with the household appliances represents, as said, a peculiar case, being purely explicative and non limiting of the present description; such condition is sufficient and desirable, being economic and showing good requirements for the standardization of the proposed method, but it is not strictly necessary for the purposes of the present invention.

Figure 3A:
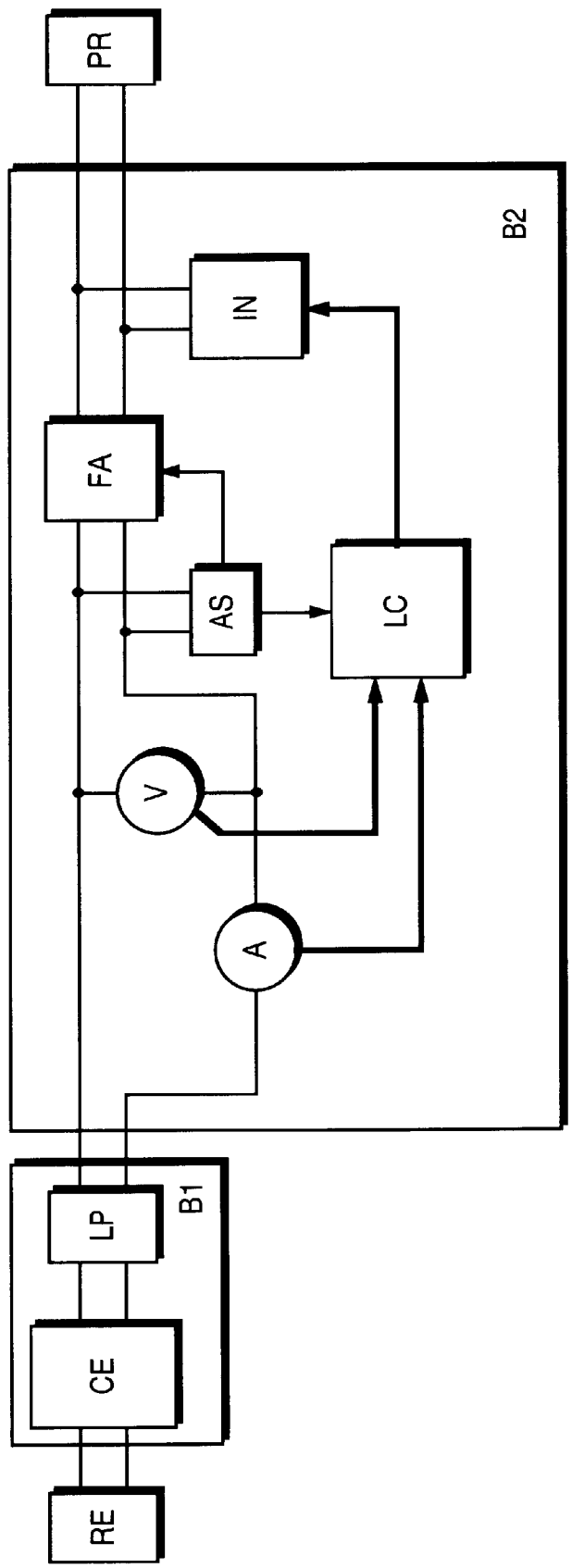
FIG. 3a represents in schematic form a possible embodiment of an apparatus for the measure of the instantaneous electric energy consumption in a home, of the type suitable for the aims of the present invention.

In fact, more in general, we can think to employ any measuring apparatus, even external to the meter CE, being able to measure the total power supplied and to send such information on a suitable "bus", to which the different domestic electric appliances are connected, according to invention (a possible embodiment of such a measuring apparatus is represented in FIG. 3a and described in the following).

Coming back to FIG. 2, blocks 16, 17 and 20 imply, finally, the knowledge, from the control system SC of each electric appliance, of the value of the contractual power Pmax. Such value may be signalled to the control system SC by using suitable hardware configuration means (e.g. configuration jumpers or switches) at the moment of the installation of the electric appliance, or, even better, may be made available on the communication bus by the energy meter CE itself (as will be described referring to FIG. 3b), so allowing to the control system SC of each electric appliance to configure itself.

The management logic of the energy consumption, expressed in the flow chart of FIG. 2 is enhanced with the concept of the priority management between the different household appliances.

In fact, in the case in which the oven FO and the dishwashing machine LS of FIG. 1 are simultaneously active, the latter can decide automatically to let more energy to the oven, the cooking of the food being considered prioritary if compared to the washing of dishes; as a consequence, the washing machine will continue with the heating of the water only during the natural pauses of the heating of the oven.

In other words, it is possible according to the present invention, to let more electric appliances to operate, which share all together an electric power value being greater than that provided for the single domestic load, without any black-outs. This result is obtained on the basis of the consideration that the household appliances have different operative phases during which the electric current absorption are different: therefore, by managing with cleverness the single operative phases and by knowing how much other "not intelligent" electric appliances are consuming, it is possible to operate in a "time sharing" mode, letting a plurality of electric appliances operative, without that this fact can cause the overcoming of the contractual power.

This supposes that each "intelligent" household appliance declares constantly, onto the communication "bus" being common with the other appliances, its instant consumption of electric energy and/or an information that allows to such other appliances to know that such "intelligent" electric appliance is operating; such information delivered on the bus is advantageously represented by the priority level of the electric appliance, established on the basis of possibly standardized rules.

In the case in which an electric load is not equipped with a control system SC, according to the present invention (as it happens, for example, for the electric iron—block 13—of FIG. 1), then it will have automatically assigned the maximum priority, if compared to the other household appliances, due to the fact that the electric iron does not have the ability to self-adjust its own energy consumption in relation to the global consumption of the domestic environment.

In FIG. 3a the blocks diagram is represented of an apparatus being able to measure the total power supplied in the domestic environment and to send such information on the communication "bus". In such FIG. 3a two blocks can be identified: block B1, being associated to the energy meter CE and to the power limiter LP, and block B2, relating to the apparatus that constantly measures the total power absorbed by an ensemble of active household appliances, and sends within regular time intervals, said measures to the appliance itself, in particular to the household appliances LB, LS and FO, that are able to take advantage of such an information in order to self-adjust themselves.

Such information is sent, as already exemplified, by means of the transmission system with carrier system data transmission, i.e. through the same wires of the domestic electric net.

It appears therefore that the functions carried out by the apparatus measuring the total absorbed power should be embodied in the same meter CE, since the main function of the meter is that of carrying out the same measure of the supplied power; however, considering that in most of countries of the world, an energy meter being able to talk with the different household appliances is not presently available, it has to be considered, even provisionally, the presence of the aforementioned external apparatus B2.

Considering block B2 relating to such an apparatus measuring the total absorbed power, we can distinguish the following pans an amperometer A, for the measure of the current;
a voltmeter V, for the measure of the voltage;

a control logic LC, for the global management of the measuring apparatus;

a stabilized supply AS, for the DC supply, at low voltage, of the different active parts of the system;

an interface IN, for the information exchange by means of the carrier data transmission system;

a filter FA, possibly of active type, for the necessary suppression of interference being generated by the carrier data transmission system.

The control logic LC, based on the use of a microprocessor, performs two fundamental functions: the measure of the active power absorbed by the household appliances and the delivery of such information on the electric line, by means of carrier data transmission system.

The measure of the absorbed active power is carried out by LC on the basis of the signals sent by the two measuring instruments A and V, and taking into account the value of the phase angle between voltage and current. The power is calculated by the circuit on the basis of the effective voltage values (from voltmeter V), of effective current (from amperometer A), and of the value of the phase angle, obtained by measuring the elapsed time between the instant in which the voltage is zero and that in which the current is zero.

The transmission on the domestic "bus" of the measured value of the active power, being absorbed by the domestic loads, is carried out by LC through the interface IN of FIG. 3a.

The interface IN of FIG. 3a is a complex one, because it must be able to talk with the control units LC and, in the meantime, must manage the exchange on the "bus" with the carrier data transmission system, ensuring the respect of the international standard on the electric safety, the electromagnetic compatibility and the information exchange.

The interface IN of block B1 is not herein described in detail, because this is not, as already said, the finality of the present invention; such interfaces can be, in any case, of any known type: in the specific case, it is supposed that said interface is of a kind similar to interfaces IN (blocks 4, 7 and 10) of FIG. 1; as an example, such interfaces IN or IN1 may be realized through a bi-directional modem of the half-duplex kind, of the type ST 7537 by SGS Thomson, associated to a suitable microcontroller for the management of the information exchange protocol.

Figure 3B:
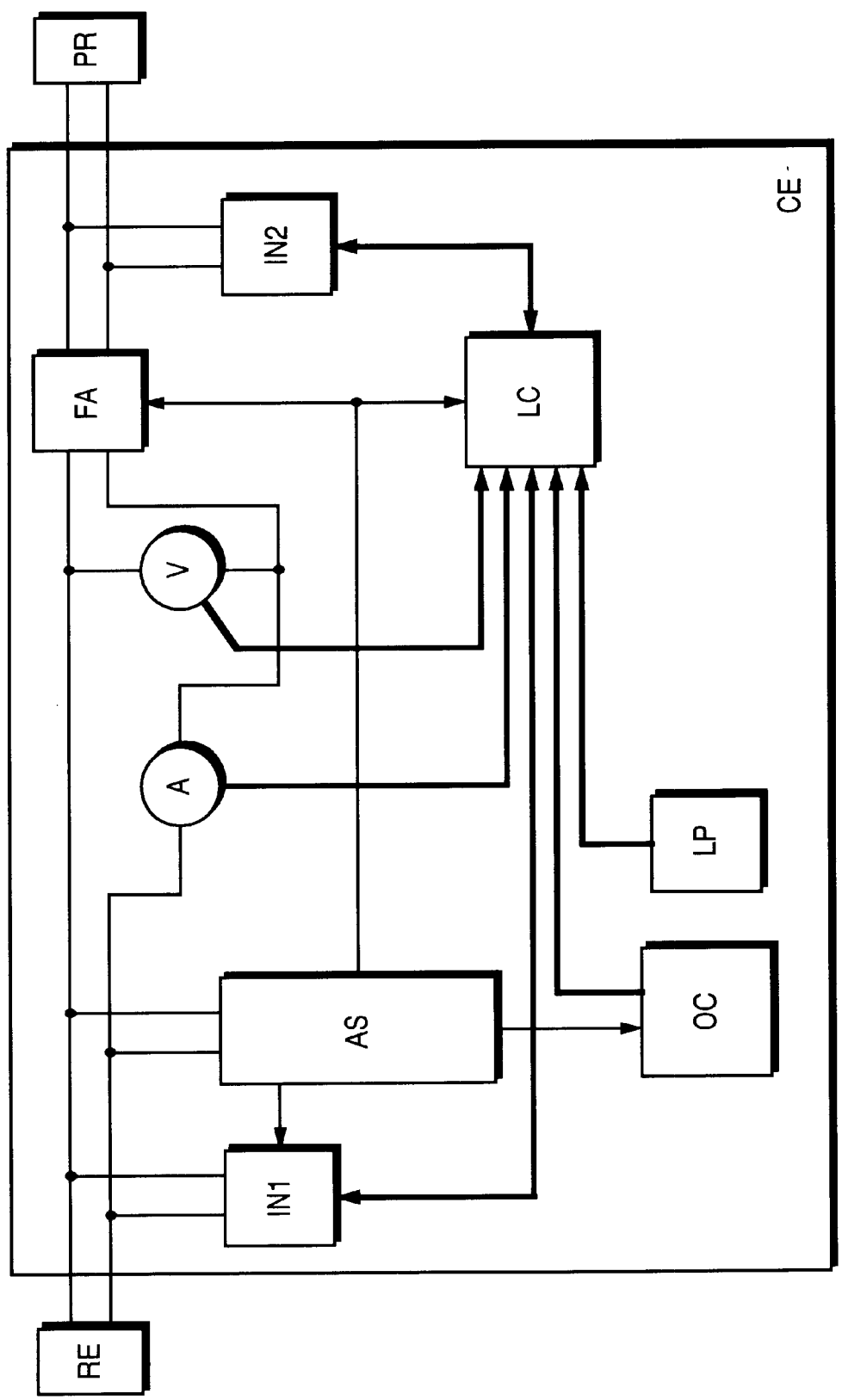
FIG. 3b represents a possible embodiment of an energy meter able to provides, besides to the value of the current energy consumption, further useful information for the aims of the present invention.

In FIG. 3b the blocks diagram is represented of an energy meter that is able to supply all the information being necessary for an advantageous embodiment of the present invention. Besides the blocks already described with reference to FIG. 3a, the following additional blocks are present:

an interface IN1, in order to allow the remote reading (telemetry) by the firm that supplies the electric energy;

a clock OC, for the management of the instant time and of different hourly fees;

a selector LP for the limitation of the maximum power which can be supplied (contractual power), on the basis of the supply contract agreed between the user and the supplier.

In this case, the main functions of the control unit LC of FIG. 3b, realized in a known way are the following:

possibility of continuously measuring the supplied active power and to sum the measures of the kWh of consumed energy (specific function of the electric energy meter);

possibility of talking, upstream, with the nearest energy distribution central, through the system of remote reading (telemetry) based on the carrier data transmission system;

possibility of differentiated management of fees in the different time periods, due to the presence of a local clock, which can be eventually managed upstream through the carrier data transmission system (function which is associated to the telemetry);

possibility of locally configure the maximum power supplied on the basis of the supply contract agreed between the user and the supplier;

possibility of talking, downstream, with the different household appliances of the house, which are prearranged for receiving by an energy meter, within regular time intervals (for example any minute), the following information:

a) measure of the total power supplied;
b) maximum value of the power supplied according to the supply contract;
c) value of the time;
d) fees associated to the different time periods.

The aforementioned information a), b), c) and d), supplied by an energy meter of the type described in FIG. 3b, allows, in a way in itself known, to a household appliances equipped with a control system according to the present invention, to optimize the electric energy consumption, so avoiding to exceed the maximum power limits fixed by the supply contract, and favouring the use of the appliances during time periods in which the electric energy has a reduced cost.

In particular, the information a) and b) allow to manage, in a totally automatic way and according to the way expressed in the flow chart of FIG. 2, the instantaneous consumption of energy, so avoiding the action of the device (LP) that limits the maximum power which can be supplied according the supply contract.

The information c) and d) allow to the different household appliances equipped with the control system SC to automatically carry out their function in connection with time periods in which the cost of the energy is reduced. Such type of performance can be set by the user through the simple pressure of a button (energy-saving button associated to time periods with lower fees), without being necessary to indicate the start hour of the operation of the same household apparatus.

Another possibility is that of showing the operation start hour, by means of the rotation of a simple knob, the index of which can vary within an interval of 24 hours, without the complication of setting up a timer with a suitable delay (delay timer) calculated with respect to the current time; in that case, only the information c) is exploited, without the necessity of disposing locally, i.e. inside of a household appliances, of a clock with the current time, being of difficult management for the user (e.g. the necessity of update after every black-out) and of considerable cost.

Figure 4:
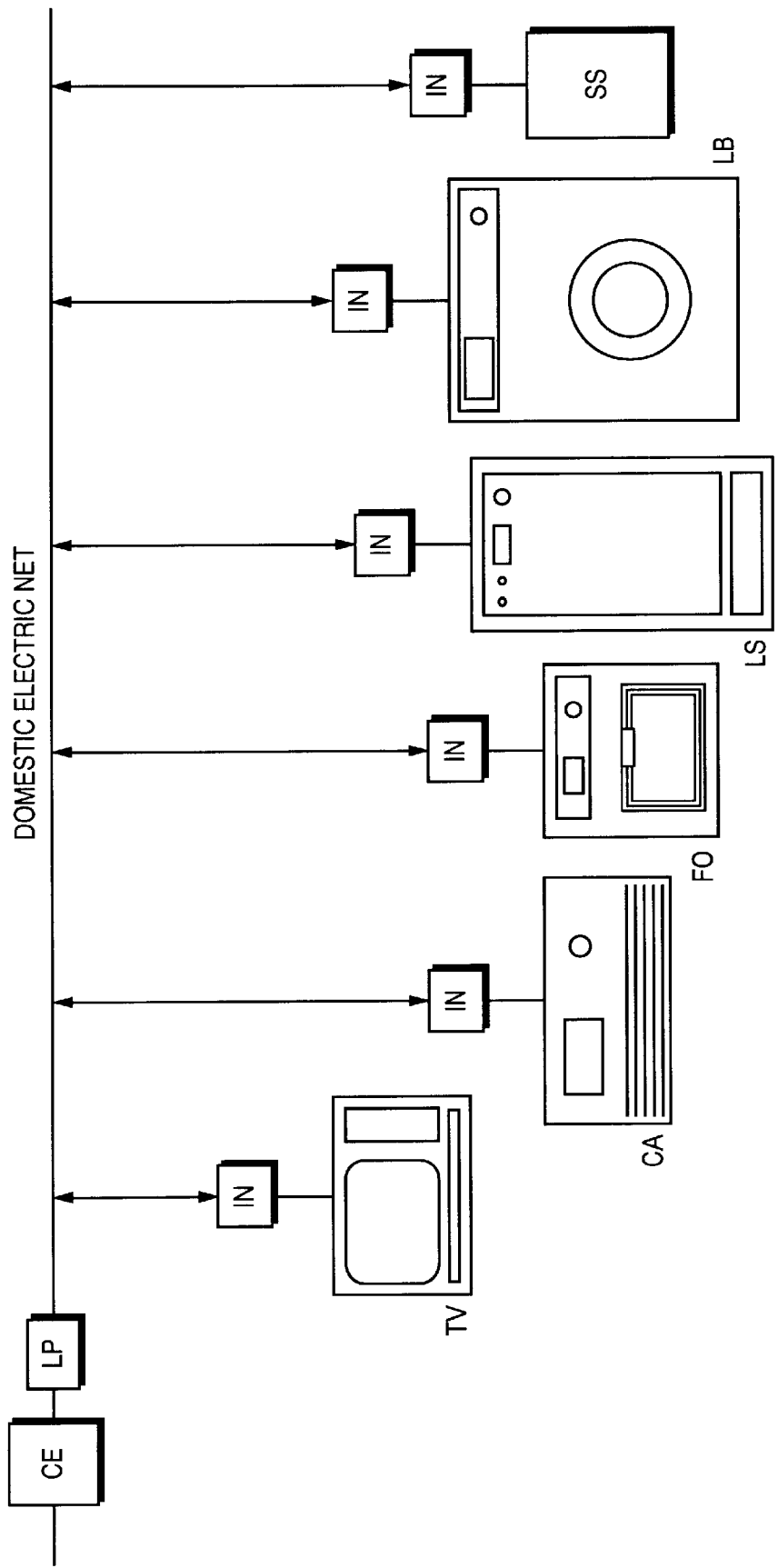
FIG. 4 illustrates in schematic form the concept of "synergy" among different domestic electric appliances, that is a direct consequence of the system according to the present invention.

FIG. 4 finally represents in a schematic form the concept of "synergy" among different household appliances, mainly used in order to avoid the exceeding of maximum power available for said loads.

Such a concept is a direct consequence of the high management capacity of the control system, according to the present invention, of the household appliances equipped with the control system SC.

It is in fact possible that each domestic electric load, being able to optimize the consumption and to reduce the costs using the information supplied by the energy meter, according to the present invention, is also able to take advantage of any eventual other useful information sent by other electric appliances onto the communication "bus".

Such information can for example relate to measures associated to determined sensors being present in particular appliances.

For example, the laundry washing machine LB, is equipped with a sensor that measures the water hardness. This value can be shared on the "bus", with a benefit for other interested electric appliances, such as the dishwashing machine, the coffee machine, the electric water heater, the electric iron, etc.

Another example may be carried out with reference to an air conditioner CA which, being equipped with air temperature and humidity sensors, can share on the "bus" the measure of these quantities, with a benefit for different interested electric appliances, such as a refrigerator, a laundry washing machine, etc.

Other example can be made with reference to the home safety system, indicated with SS, that is equipped with sensors being able to detect gas leakage; also such information can be delivered on the "bus", in order to warn other eventual appliances about dangerous situations and allow the self switching-off of all those household appliances that can cause sparks.

A further example may be made with reference to some peculiar domestic electric appliances, that can send on the "bus" information being useful for the user, that can be shown on a television set TV: for example, the oven FO can communicate the end of a cooking process, the washing-machine LB the end of a washing process, a freezer the deadline for the maximum preservation period of a certain foodstuff and so on.

From the above descriptions the characteristics and advantages of the present invention are clear.

In particular, according to the present invention, it is possible to obtain the optimal management of the electric energy consumption in a domestic environment, without involving any complex programming action by the user.

The scope of such optimization is that of preventing the exceeding of the power limits established by the supply contract, so avoiding the possible black-out caused by the action of the power limiter (LP), and of favouring the use of the different household appliances during time periods in which the electric energy has a reduced cost. In particular it is evident that, being available domestic electric appliances equipped with a control system (SC) having the previously described autonomy characteristics, it is possible to rationalize the consumption of the electric energy in a fully automatic way, without having to employ complex and expensive centralized control apparatuses.

The sole condition for performing said rationalization of the energy consumption, according to proposed method, is the presence of a device that measures the absorbed power, that is able to communicate with the control system of each single "intelligent" domestic electric appliances.

The household appliances that are made "intelligent", according to the present invention, can adapt its own operative cycles in function of the available current and, therefore, also according to eventual "not intelligent" electric appliances, to which a maximum priority is assigned; eventually, according to the present invention, can also be used to manage in a fully autonomous way the hour, so making unnecessary an on-board clock.

Advantages are finally also evident, in terms of cost for the user, if compared to the known solutions (mainly in consideration of the fact that most of the electric appliances actually produced already comprise a microcontroller, the capability of which is not usually fully exploited).

Another aspect of the invention that has to be underlined is the concept of "synergy" between the different household appliances equipped with the control system SC, based on the possibility of sharing the information associated to different sensors, being available on the communication "bus" of the domestic environment.

It is clear that numerous variations are possible for those skilled in the art to the method described as an example, without departing from the spirit and the scope of the inventive idea. For example, the use of the above mentioned carrier data transmission system has been shown as a pure example, because of its practical convenience, due to the fact that it does not require the installation of any communication line and is thus compatible with the electric net of any domestic environment; it is however clear that other means can he utilized for the exchange of information being necessary for the present invention, for example a simple cable with two wires, similar to the telephonic bight (that would be the more economic solution), a coaxial cable, a system with radio waves, a infrared radiation system etc.

What is claimed is:

1. A method for managing energy consumption by electrical appliances operatively connected to an electrical network, each of which presents an electrical load to a source of power that is also connected to the network for supply power to the appliances, comprising providing each one of a plurality of said appliances with a programmed electronic control system, measuring the instantaneous total consumption of electrical energy from said power source with a measuring device, transmitting to each control system information from said measuring device information which is a function of the instantaneous total consumption of electrical energy from said power source, and causing each control system to adjust the load presented to said power source by its corresponding appliance in response to the information provided thereto.

2. A method, according to claim 1, wherein each of said electronic control systems is programmed to adjust the load presented to said power source without user intervention.

3. A method, according to claim 1, further comprising causing each control system of an appliance to dynamically self-adjusting its energy consumption, as a function of the energy consumption of other ones of said appliances.

4. A method, according to claim 3, further comprising causing each control system of an appliance to dynamically self-adjusting its energy consumption, as a function of the difference between the maximum energy available to the appliances and the instantaneous total energy consumption of the appliances.

5. A method, according to claim 3, further comprising causing the control system corresponding to each household appliance to reduce the energy consumption of its corresponding appliance in response to the instantaneous total energy consumption of the appliances approaching the maximum energy available to the appliances.

6. A method, according to claim 5, further comprising causing each control system to periodically compare the total instantaneous energy consumption with the maximum energy available to the appliances.

7. A method, according to claim 6, further comprising causing a control system to reduce the energy consumption of its corresponding appliance by a magnitude equal to or greater than the difference between the magnitude of the total instantaneous energy consumption and the maximum energy available to the appliances in response to the total instantaneous energy consumption approaching the maximum energy available to the appliances.

8. A method, according to the claim 6, further comprising causing one of the control systems to increase the energy consumption of its corresponding appliance by a magnitude equal to or less than the difference between the magnitude of the total instantaneous energy consumption and the maximum energy available to the appliances in response to the total instantaneous energy consumption being less than the maximum energy available to the appliances and said one of the control systems having previously reduced the energy consumption of its corresponding appliance.

9. A method, according to claim 1, further comprising periodically providing to each of said control systems information which is a function of the measurement of the total instantaneous consumption of electric energy by said appliances.

10. A method, according to claim 1, further comprising providing to each of said control systems information which is a function of the maximum power available from said source, and causing each control system to adjust the load presented to said power source by its corresponding appliance as a function of said maximum available power.

11. A method, according to claim 10, further comprising storing in each of said electronic control systems, a magnitude which is a function of the maximum available power from the source.

12. A method, according to claim 10, further comprising transmitting to each of said electronic control systems a magnitude which is a function of the available maximum power from the source, and causing each of said control systems to store said transmitted magnitude.

13. A method, according to claim 1, further comprising storing in each of said control systems information indicative of the priority of the appliance corresponding to said control system relative to priorities of other one of said appliances.

14. A method, according to claim 13, further comprising causing each one of the electronic control systems to transmit to each other one of the electronic control systems information indicative of the current energy consumption of said one control system and the priority assigned to the appliance corresponding to said one control system.

15. A method, according to claim 13, further comprising assigning a maximum priority to an appliance connected to the source of power which does not have a corresponding electronic control system.

16. A method, according to claim 1, further comprising exchanging information between each of the control systems and the measuring device.

17. A method, according to claim 16, wherein the information is transmitted and received on the electrical network.

18. A method, according to claim 16, further comprising performing said information exchange among the control systems and measuring device in accordance with a predetermined communication protocol.

19. A method, according claim 1, wherein the measuring device comprises, ammeter means for measuring the electrical current output of said source of power, voltmeter means for measuring the voltage across said source of power, control logic circuitry means operatively connected to said ammeter means and said voltmeter means for producing signals indicative of the power output of said source of power to said appliances, and interface means operatively connected between said control logic circuitry means for enabling the exchange of information between said control logic circuitry means and said electronic control systems.

20. A method, according to claim 19, wherein the measurement of instantaneous total consumption of electrical energy is done by said control logic circuitry means as a function of information supplied by said ammeter means and said voltmeter means.

21. A method, according to claim 20, wherein the measurement of instantaneous total consumption of electrical energy is done by said control logic circuitry means as a further function of the magnitude of the phase angle between the voltage and the current, the phase angle being determined from by measuring the time elapsed between a time at which the voltage is zero and a time at which the current is zero.

22. A method, according to claim 1, wherein the measuring device comprises, receiver means for receiving power consumption information from a supplier of electrical energy to the source of power.

23. A method, according to claim 22, further comprising causing said measuring device to transmit the current time, whereby at least one of said control systems can manage the power consumption of its respective appliance as a function of time, without need for a local clock situated at said one control system and its corresponding appliance.

24. A method, according to claim 1, further comprising measuring the instantaneous total consumption of electrical energy from the power source with a measuring device by continuously measuring and summing the power consumed by each of the appliances.

25. Apparatus for managing the power consumption of appliances on a powered network, comprising, measuring means operatively connected to said network for transmitting information indicative of the total instantaneous consumption of power on said network, and a plurality of electronic control systems in one to one correspondence with a plurality of said appliances, each of said control systems including receiver means for receiving from said measuring means said information indicative of the total instantaneous consumption of power on said network, maximum power storage means for storing information indicative of the maximum power available on the network, comparison means responsive to said receiver means and to said maximum power storage means for comparing the instantaneous consumption of power on said network with the maximum power available on the network, and control means responsive to said comparison means for adjusting the load presented by said corresponding appliance to said network in response to said comparison means.

26. Apparatus, according to claim 25, wherein said maximum power storage means comprises means for remotely receiving said information indicative of the maximum power available on the network.

27. Apparatus, according to claim 25, wherein at least one of said control systems further comprises sensor means for detecting an operating condition of its respective appliance and transmitting information indicative thereof to another one of said control systems.

28. Apparatus, according to claim 25, wherein each of said control systems further comprises priority means for storing information indicative of the priority of its corresponding appliance relative to other appliances on the network, said comparison means being further responsive to said control means for adjusting the load presented by said corresponding appliance to said network.

29. Apparatus for managing a plurality of electronic appliances comprising a plurality of electronic control systems in one to one correspondence with said plurality of electronic appliances, at least a first one of said control systems having sensor means for detecting an operating condition of its respective appliance and transmitting information indicative thereof to a second one of said control systems, said second one of said control systems having receiver means for receiving said information from said sensor means and control means responsive to said receiver means for controlling the operation of its respective appliance.

* * * * *